(12) United States Patent
Wang et al.

(10) Patent No.: US 9,904,374 B2
(45) Date of Patent: Feb. 27, 2018

(54) DISPLAYING CORRECTED LOGOGRAM INPUT

(71) Applicant: LENOVO (Singapore) PTE, LTD., New Tech Park (SG)

(72) Inventors: Song Wang, Cary, NC (US); Jian Li, Chapel Hill, NC (US); Ming Qian, Cary, NC (US); Bradley Park Strazisar, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 551 days.

(21) Appl. No.: 14/548,142

(22) Filed: Nov. 19, 2014

(65) Prior Publication Data

US 2016/0139682 A1    May 19, 2016

(51) Int. Cl.
*G06F 3/023* (2006.01)
(52) U.S. Cl.
CPC .................................. *G06F 3/0237* (2013.01)

(58) Field of Classification Search
None
See application file for complete search history.

(56) References Cited

U.S. PATENT DOCUMENTS

| | | | |
|---|---|---|---|
| 2009/0225041 A1* | 9/2009 | Kida | G06F 3/0237 345/173 |
| 2009/0295737 A1* | 12/2009 | Goldsmith | G06F 3/018 345/169 |

OTHER PUBLICATIONS

Liu, Online Recognition of Chinese Characters: The State of the Art, Feb. 2004, IEEE Transactions on Pattern Analysis and Machine Intelligence, vol. 26 No. 2, pp. 198-213.*

* cited by examiner

*Primary Examiner* — Patrick Edouard
*Assistant Examiner* — Douglas M Wilson
(74) *Attorney, Agent, or Firm* — Kunzler, PC (57) ABSTRACT

For displaying corrected logogram input, code detects a difference between the logogram input and a logogram recognized from the logogram input. The code further displays the corrected logogram input in response to the difference.

20 Claims, 7 Drawing Sheets

DISPLAYING CORRECTED LOGOGRAM INPUT

FIELD

The subject matter disclosed herein relates to logogram input and more particularly relates to displaying corrected logogram input.

BACKGROUND

Description of the Related Art

Logograms, such as Chinese characters, Japanese characters, and the like, are often entered using phonetic representations or other input methods.

BRIEF SUMMARY

An apparatus for displaying corrected logogram input is disclosed. The apparatus includes a graphical input, a display, a processor, and a memory. The graphical input accepts a logogram input. The display displays the logogram input. The memory stores code executable by the processor. The code detects a difference between the logogram input and a logogram recognized from the logogram input. The code further displays a corrected logogram input on the display in response to the difference. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
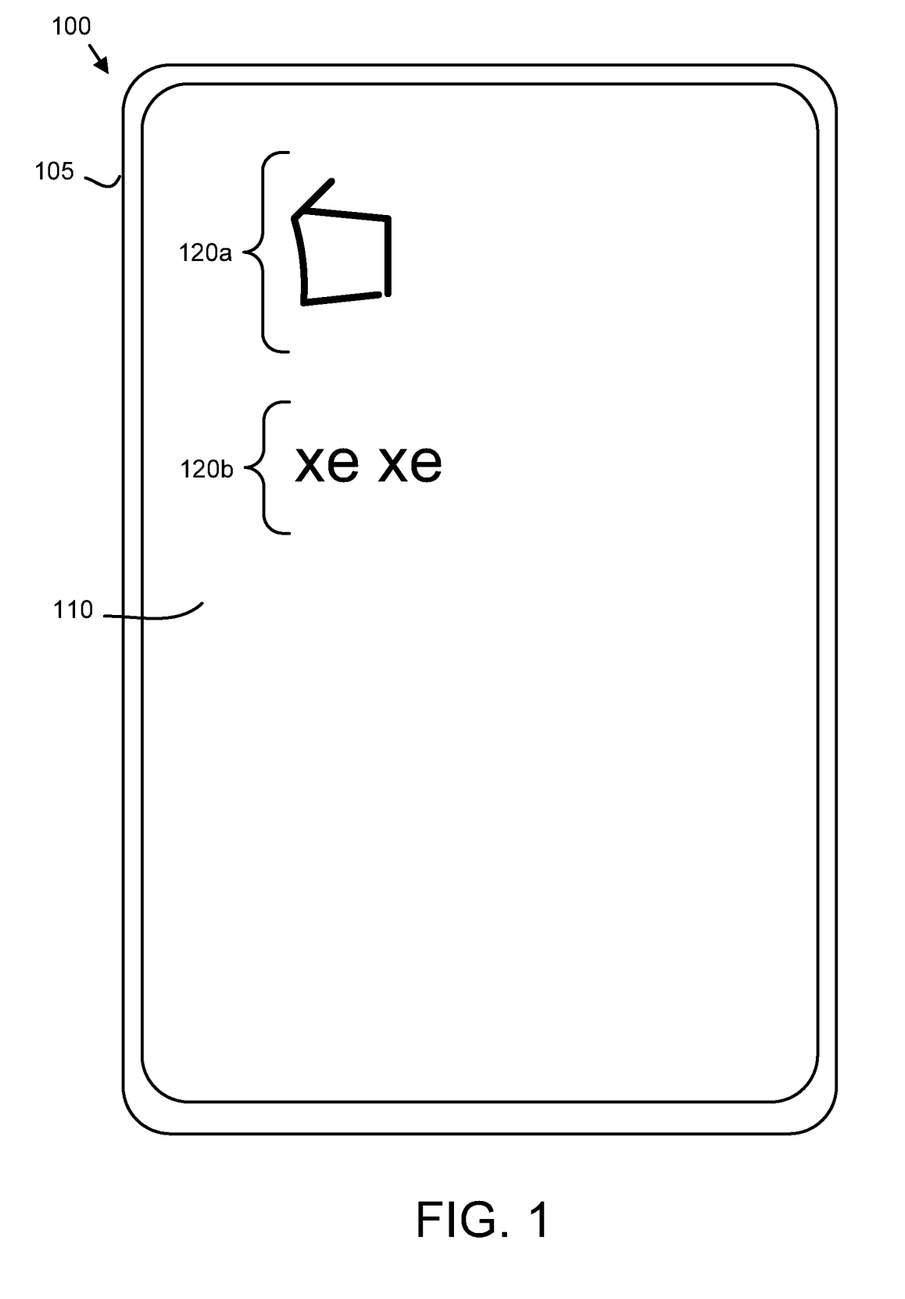
FIG. 1 is a drawing illustrating one embodiment of an electronic device.

FIG. 1 is a drawing illustrating one embodiment of an electronic device 100. In the depicted embodiment, the electronic device 100 is a tablet computer. Alternatively, the electronic device 100 may be a mobile telephone, a laptop computer, a computer workstation, or the like. In one embodiment, the electronic device 100 includes a graphical input 105 and display 110.

The graphical input 105 is depicted as accepting logogram input 120. The logogram input 120a may be a handwritten logogram or a portion of a handwritten logogram such as a logogram radical logogram input 120a. Alternatively, the logogram input 120b may be a phonetic representation. For example, the phonetic representation may be Chinese pinyin logogram input 120b.

In the depicted embodiment, the logogram input 120 is incorrect for the desired logograms that a user wishes to enter into the electronic device 100. The first logogram input 120a is an incorrect rendition of the Chinese logogram radical "丨" while the second logogram input 120b is an incorrect rendition of the Chinese pinyin "xie xie."

In the past, when a user incorrectly entered logogram input 120, the user might eventually find the desired logogram. However, the user was often still uncertain what logogram input 120 should have been entered into the electronic device 105 in order to generate the desired logogram. The embodiments described herein detect a difference between the logogram input 120 and a logogram that is recognized from the logogram input 120. In addition, the embodiments display a corrected logogram input in response to the difference. As a result, the user is educated as to the logogram input 120 that should be entered to generate the desired logogram.

Figure 2A:
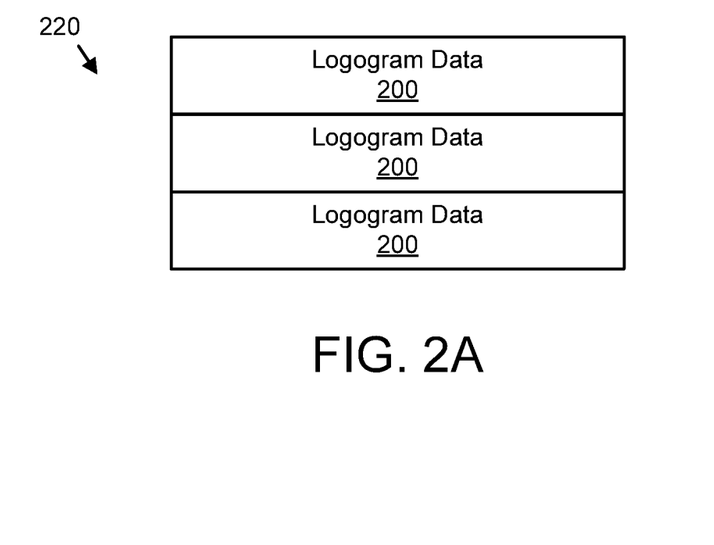
FIG. 2A is a schematic block diagram illustrating one embodiment of a logogram database.

FIG. 2A is a schematic block diagram illustrating one embodiment of a logogram database 220. The logogram database 220 maybe organized as a data structure in a memory. The logogram database 220 may store logogram data 200 for a plurality of logograms.

Figure 2B:
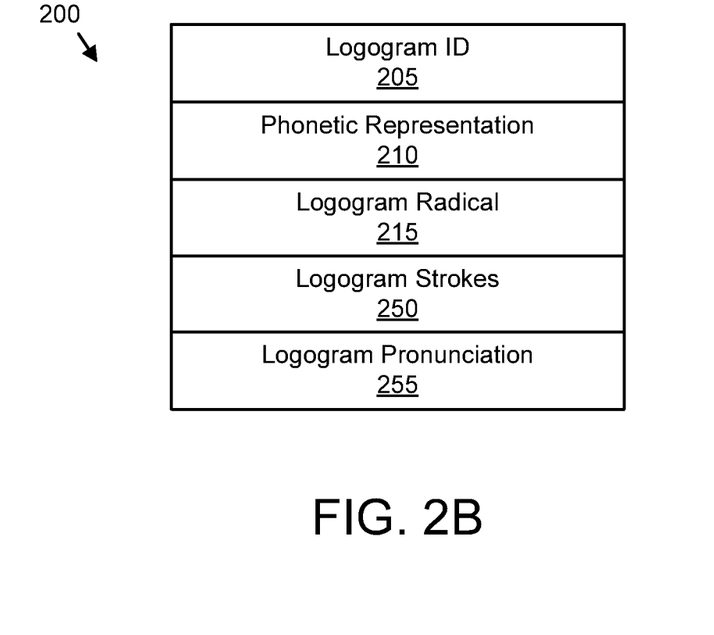
FIG. 2B is a schematic block diagram illustrating one embodiment of logogram data.

FIG. 2B is a schematic block diagram illustrating one embodiment of logogram data 200. The logogram data 200 maybe organized as a data structure in the memory. The logogram data 200 may describe a given logogram. In the depicted embodiment, the logogram data 200 includes a logogram identifier 205, a phonetic representation 210, a logogram radical 215, logogram strokes 250, and a logogram pronunciation 255.

The logogram identifier 205 may uniquely identify a logogram. In one embodiment, the logogram identifier 205 is the Unicode value for the logogram.

The phonetic representation 210 may comprise a written phonetic representation. For example, the written phonetic representation for Chinese logograms may be pinyin. The logogram radical 215 may identify the radical of the logogram. The logogram radical 215 may include an index to a radical database.

The logogram strokes 250 may describe one or more written strokes that render the logogram. The logogram pronunciation 255 may be recorded pronunciation of the logogram.

Figure 2C:
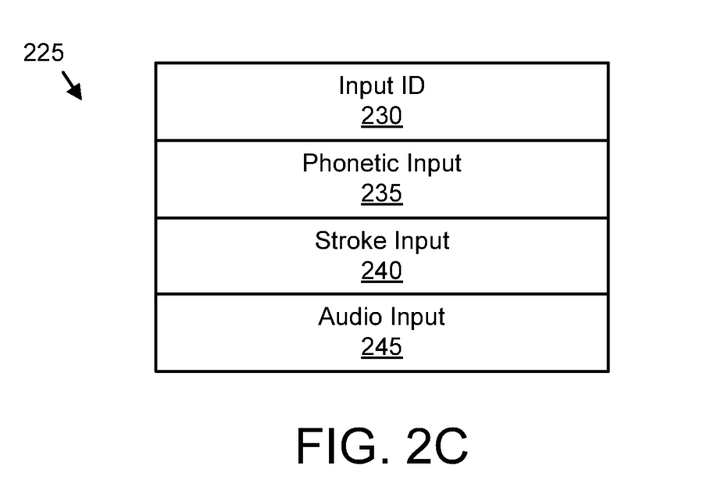
FIG. 2C is a schematic block diagram illustrating one embodiment of logogram input data.

FIG. 2C is a schematic block diagram illustrating one embodiment of logogram input data 225. The logogram input data 225 maybe organized as a data structure in the memory. In one embodiment, the logogram input data 225 is generated from the logogram input 120. In the depicted embodiment, the logogram input data 225 includes an input identifier 230, phonetic input 235, stroke input 240, and audio input 245.

The input identifier 230 may uniquely identify the logogram input 120. The input identifier 230 may be an index value and may include a timestamp for the logogram input 120, a location of the logogram input 120 on the display 110, a generated value, or combinations thereof.

The phonetic input 235 may be a written phonetic representation of the logogram input 120 such as is illustrated with the second logogram input 120b. The stroke input 240 may record one or more written strokes that are entered on the graphical input 105 such as is illustrated with the first logogram input 120a. The audio input 245 may be an audio recording of spoken logogram input 120.

Figure 2D:
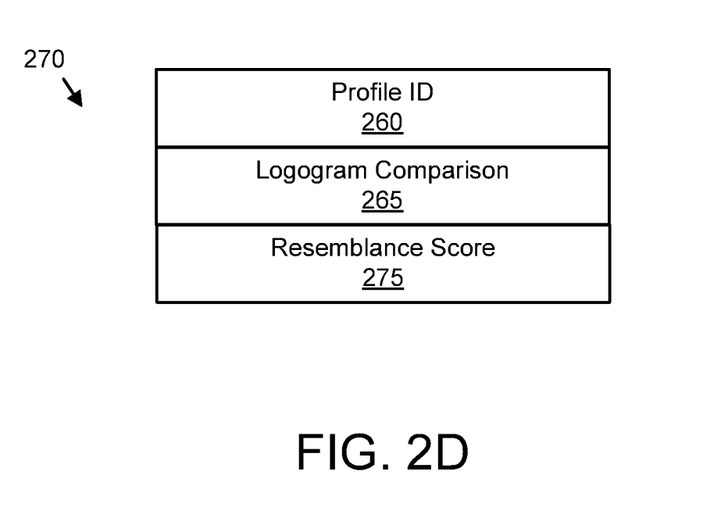
FIG. 2D is a schematic block diagram illustrating one embodiment of a resemblance profile.

FIG. 2D is a schematic block diagram illustrating one embodiment of a resemblance profile 270. The resemblance profile 270 may be organized as a data structure in the memory. The resemblance profile 270 may be used to identify a logogram from the logogram input 120. In the depicted embodiment, the resemblance profile 270 includes a profile identifier 260, a logogram comparison 265, and resemblance score 275.

The profile identifier 260 may uniquely identify the resemblance profile 270. In one embodiment, the profile identifier 260 includes an index to an input identifier 230 of logogram input data 225 and an index to a logogram identifier 205 of the logogram data 200.

The logogram comparison 265 compares one or more of the phonetic input 235, the stroke input 240, and the audio input 245 from the logogram input data 225 with the logogram data 200 of a specified logogram. The resemblance score 275 records a score calculated from the logogram comparison 265.

Figure 3A:
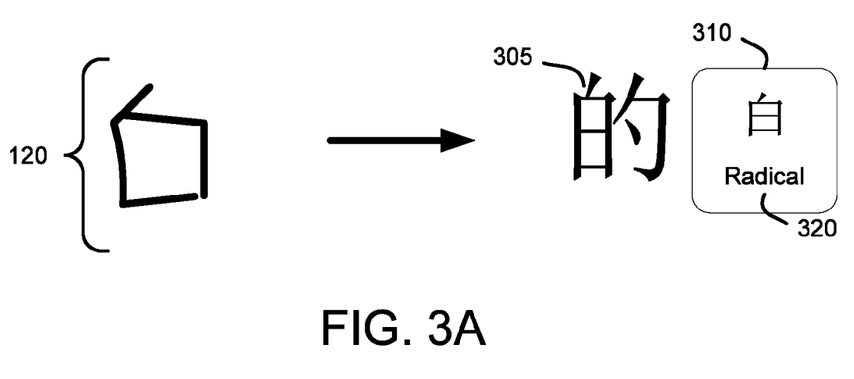
FIG. 3A is a drawing illustrating one embodiment of displaying a corrected logogram radical.

FIG. 3A is a drawing illustrating one embodiment of displaying a corrected logogram radical. In the depicted embodiment, the incorrect logogram input 120 of a radical is eventually determined to be the logogram 305 "的" The embodiments may detect the difference between the logogram input 120 and the logogram 305 recognized from the logogram input 120. In response to the difference, the embodiments display a corrected logogram input 310. In the depicted embodiment, the corrected logogram input 310 is the logogram radical 215 "白" The corrected logogram input 310 displays the logogram radical 215. In addition, the corrected logogram radical 310 may display a label 320 that the corrected logogram input 310 is a "radical."

Figure 3B:
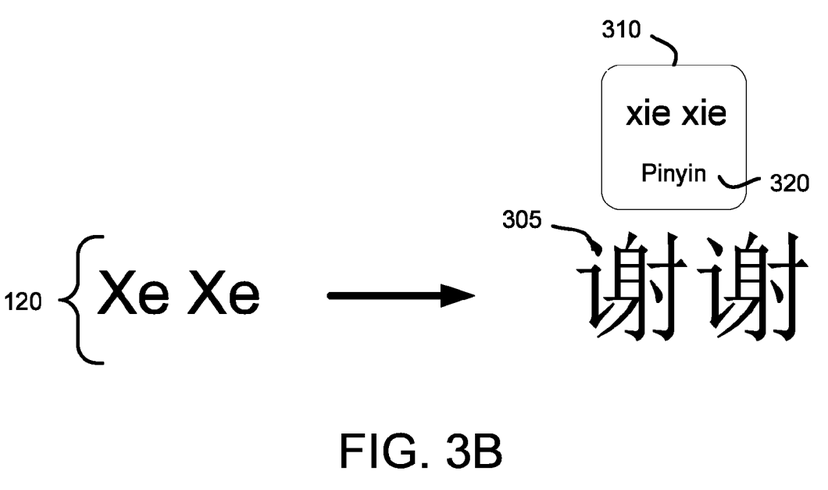
FIG. 3B is a drawing illustrating one embodiment of displaying a corrected phonetic representation.

FIG. 3B is a drawing illustrating one embodiment of displaying a corrected phonetic representation. In the depicted embodiment, the incorrect logogram input of a pinyin phonetic representation is eventually determined to be the logograms 305 "谢谢." The embodiments may detect the difference between the logogram input 120 and the logogram 305 recognized from the logogram input 120. In response to the difference, the embodiments display a corrected logogram input 310. In the depicted embodiment, the corrected logogram input 310 is the pinyin phonetic representation "xie xie." The corrected logogram input 310 displays the phonetic representation. In addition, the corrected logogram radical 310 may display a label 320 that the corrected logogram input 310 is "pinyin."

Figure 4:
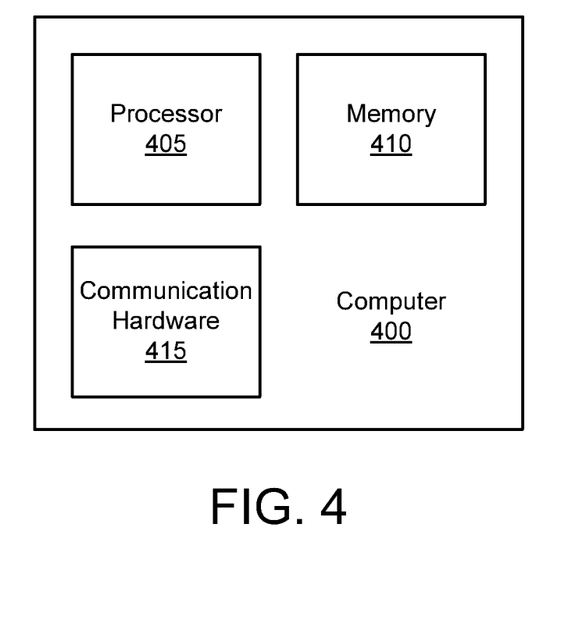
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 400. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5A:
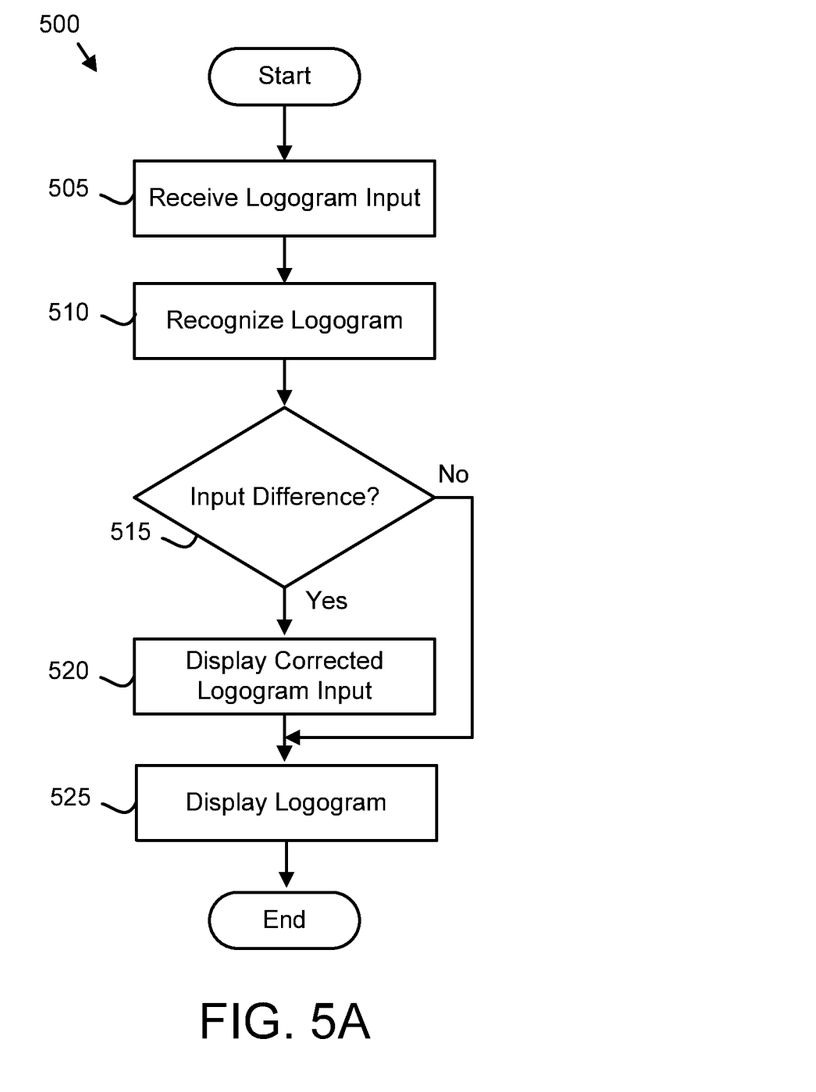
FIG. 5A is a schematic flow chart diagram illustrating one embodiment of a corrected logogram input display method.

FIG. 5A is a schematic flow chart diagram illustrating one embodiment of a corrected logogram input display method 500. The method 500 may display the corrected logogram input 310. The method 500 may be performed by the processor 405. Alternatively, the method 500 may be performed by computer readable storage medium such as the memory 410. The computer readable storage medium may store code that is executable by the processor 405 to perform the functions of the method 500.

The method 500 starts, and in one embodiment, the code receives 505 the logogram input 120. The logogram input 120 may be accepted by the graphical input 105 of the electronic device 100. The code may further generate the logogram input data 225 from the logogram input 120. If the logogram input 120 includes written strokes, the code may generate the stroke input 240 from the logogram input 120. If a logogram input 120 includes a phonetic representation, the code may store the phonetic representation as the phonetic input 235. If the logogram input 120 includes a spoken input, the code may record the spoken input as the audio input 245.

The code may further recognize 510 the logogram 305 from the logogram input 120 and the logogram input data 225. The recognition 510 of the logogram 305 is described in more detail in FIG. 5B.

The code further detects 515 a difference between the logogram input 120 and the logogram 305 recognized from the logogram input 120. If the logogram input 120 includes a phonetic representation, the code may compare the phonetic input 235 of the logogram input data 225 with the phonetic representation 210 of the logogram data 200 to detect 515 the difference. For example, the code may detect 515 the difference between the pinyin logogram input 120b "xe xe" of FIG. 1 and the correct pinyin phonetic representation 210 "xie xie" the logograms 305 " 谢谢 谢谢 " of FIG. 3B. The code may detect 515 the difference if the logogram input 120 is not the same as the phonetic representation 210.

If the logogram input 120 includes written strokes, the code may compare the stroke input 240 of the logogram input data 225 with the logogram strokes 250 of the logogram data 200 to detect 515 the difference. For example, the code may detect 515 the difference between the strokes and/or stroke order of the logogram radical logogram input 120a of FIG. 1 and the strokes and/or stroke order of the correct radical of the logogram 305 "的" of FIG. 3A. The code may detect 515 the difference if the strokes are not the same. Alternatively, the code may detect 515 the difference if the strokes and the stroke order are not the same.

If the logogram input 120 includes spoken input, the code may compare the audio input 245 of the logogram input data 225 with the logogram pronunciation 255 of the logogram data 200 to detect 515 the difference. The code may detect 515 the difference if the audio input 245 is not within an audio threshold of equivalent to the logogram pronunciation 225.

If the code does not detect 515 a difference between the logogram input 120 and the recognized logogram 305, the code displays 525 the logogram 305 and the method 500 ends. If the code detects 515 a difference between the logogram input 120 and the recognized logogram 305, the code displays 520 the corrected logogram input 310.

The corrected logogram input 310 may include one or more of the phonetic representation 210, the logogram radical 215, the logogram strokes 250, and/or the logogram pronunciation 255 from the logogram data 200 for the recognized logogram 305. In one embodiment, the corrected logogram input 310 includes a label 320 identifying the correction type of the corrected logogram input 310. For example, the correction type may be a phonetic representation correction type, a radical correction type, a stroke correction type, and/or a pronunciation correction type.

The code may further display 525 the logogram 305 with the corrected logogram input 310 and the method 500 ends.

Figure 5B:
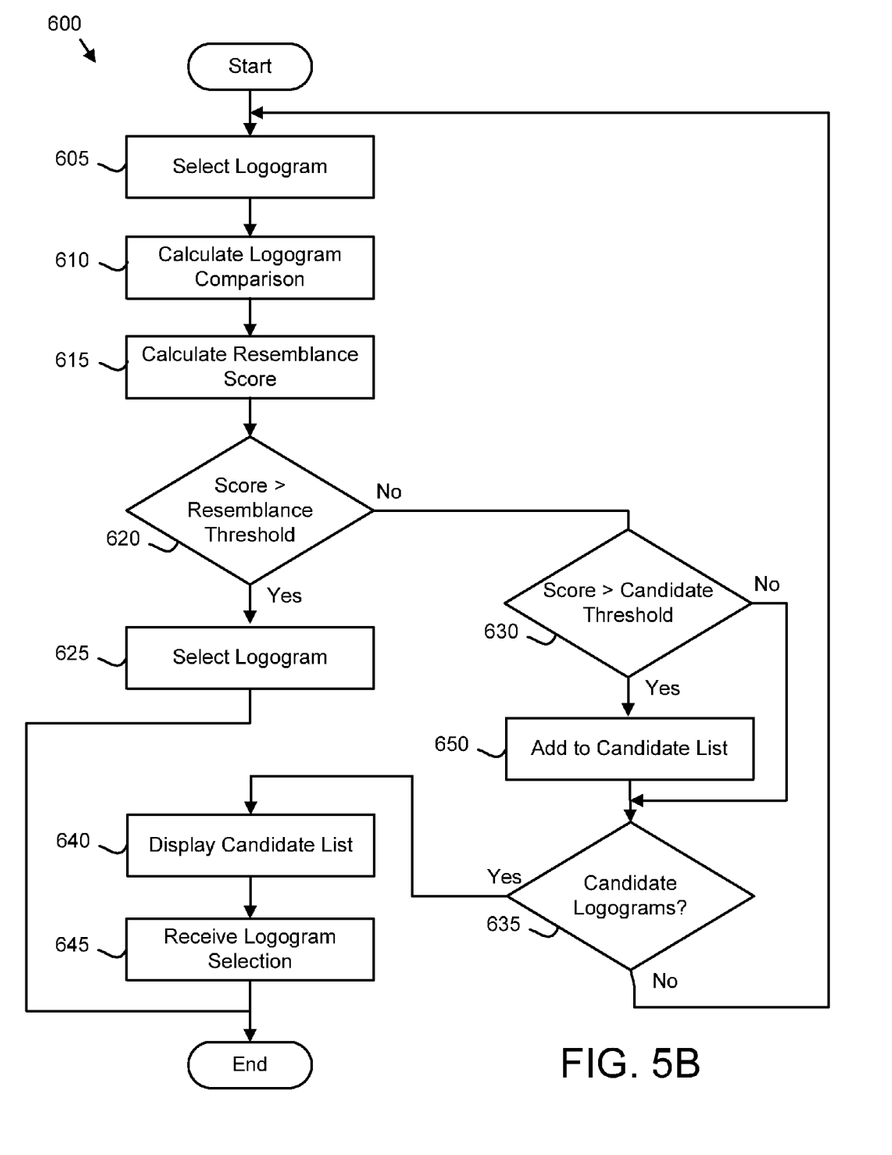
FIG. 5B is a schematic flow chart diagram illustrating one embodiment of a logogram recognition method.

FIG. 5B is a schematic flow chart diagram illustrating one embodiment of a logogram recognition method 600. The method 600 may recognize the recognize logograms 305. The method 600 may be performed by the processor 405. Alternatively, the method 600 may be performed by computer readable storage medium such as the memory 410. The computer readable storage medium may store code that is executable by the processor 405 to perform the functions of the method 600.

The method 600 starts, and in one embodiment, the code selects 605 a logogram from the logogram database 220. The code may further calculate 610 the logogram comparison 265 and calculate 615 the resemblance score 275 of the resemblance profile 270 for the logogram input data 225 and the logogram data 200 of the selected logogram.

The code may determine 620 if the resemblance score 275 exceeds a resemblance threshold. The resemblance threshold may be set at a value such that the logogram data 200 that exceeds the resemblance threshold is likely the desired logogram. If the resemblance score 275 exceeds the resemblance threshold, the code may select 625 the logogram as the recognized logogram and the method 600 ends.

If the resemblance score 275 does not exceed the resemblance threshold, the code may determine 630 if the resemblance score 275 exceeds a candidate threshold. The candidate threshold may be lower than the resemblance threshold. The candidate threshold may be set at a level such that the logogram data 200 that exceeds the candidate threshold is a likely desired logogram.

If the resemblance score 275 exceeds the candidate threshold, the logogram is added 650 to a candidate list and the code determine 635 if all logograms have been tested. If all logograms have not been tested, the code selects 605 a new logogram. If the resemblance score 275 does not exceed the candidate threshold, the code determine 635 if all logograms have been tested. If all logograms have not been tested, the code selects 605 a new logogram.

If all logograms have been tested, the code displays 640 the candidate list on the electronic device 105. The user may select a logogram from the candidate list and the code may receive 645 the selected logogram as a recognize logogram and the method 600 ends.

The embodiments detect a difference between the logogram input 120 and a logogram 305 as recognized from the logogram input 120. In addition, the embodiments display a corrected logogram input 310 in response to the difference. As a result, the user is educated in the correct logogram input 120 needed to generate the desired logogram 305.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a graphical input that accepts a logogram input;
a display that displays the logogram input;
a processor;
a memory that stores code executable by the processor to:
receive the logogram input;
display a candidate list of candidate logograms based on the logogram input;
receive a logogram selection from the candidate list;
detect a difference between the logogram input and the logogram selection; and
display a corrected logogram input and a label that identifies a correction type on the display in response to the difference, wherein the corrected logogram input is a needed logogram input that generates the selected logogram as a candidate logogram in the candidate list with a resemblance score that exceeds a resemblance threshold stored in a resemblance profile.

2. The apparatus of claim 1, wherein the code is further executable by the processor to recognize the logogram from the logogram input.

3. The apparatus of claim 1, wherein the logogram input comprises a phonetic representation of the logogram and the corrected logogram input comprises a corrected phonetic representation.

4. The apparatus of claim 1, wherein the logogram input comprises a logogram radical of the logogram and the corrected logogram input comprises a corrected logogram radical.

5. The apparatus of claim 4, wherein detecting the difference between the logogram input and the logogram radical comprises:
calculating the resemblance score for the logogram input and one or more potential logograms; and
identifying the logogram from one of the resemblance score for the logogram exceeding a resemblance threshold and selecting the logogram from the candidate list, wherein each candidate logogram has a resemblance score for the candidate logogram that exceeds the candidate threshold.

6. The apparatus of claim 4, wherein the corrected logogram radical comprises strokes.

7. The apparatus of claim 4, wherein the corrected logogram radical comprises strokes in a stroke order.

8. The apparatus of claim 1, wherein the logogram input comprises strokes and the corrected logogram input comprises strokes in a stroke order for the logogram.

9. A method comprising:
receiving, by use of a processor, a logogram input;
displaying a candidate list of candidate logograms based on the logogram input;
receiving a logogram selection from the candidate list;
detecting a difference between the logogram input and the logogram selection; and
displaying a corrected logogram input and a label that identifies a correction type in response to the difference, wherein the corrected logogram input is a needed logogram input that generates the selected logogram as a candidate logogram in the candidate list with a resemblance score that exceeds a resemblance threshold stored in a resemblance profile.

10. The method of claim 9, the method further comprising recognizing the logogram from the logogram input.

11. The method of claim 9, wherein the logogram input comprises a phonetic representation of the logogram and the corrected logogram input comprises a corrected phonetic representation.

12. The method of claim 9, wherein the logogram input comprises a logogram radical of the logogram and the corrected logogram input comprises a corrected logogram radical.

13. The method of claim 12, wherein detecting the difference between the logogram input and the logogram radical comprises:
calculating the resemblance score for the logogram input and one or more potential logograms; and
identifying the logogram from one of the resemblance score for the logogram exceeding a resemblance threshold and selecting the logogram from the candidate list, wherein each candidate logogram has a resemblance score for the candidate logogram that exceeds the candidate threshold.

14. The method of claim 12, wherein the corrected logogram radical comprises strokes.

15. The method of claim 12, wherein the corrected logogram radical comprises strokes in a stroke order.

16. The method of claim 9, wherein the logogram input comprises strokes and the corrected logogram input comprises strokes in a stroke order for the logogram.

17. A program product comprising a non-transitory computer readable storage medium that stores code executable by a processor, the executable code comprising code to perform:
receiving a logogram input;
displaying a candidate list of candidate logograms based on the logogram input;
receiving a logogram selection from the candidate list;
detecting a difference between the logogram input and the logogram selection; and
displaying a corrected logogram input in response to the difference, wherein the corrected logogram input is a needed logogram input that generates the selected logogram as a candidate logogram in the candidate list with a resemblance score that exceeds a resemblance threshold stored in a resemblance profile.

18. The program product of claim 17, the processor further performing recognizing the logogram from the logogram input.

19. The program product of claim 17, wherein the logogram input comprises a phonetic representation of the logogram and the corrected logogram input comprises a corrected phonetic representation.

20. The program product of claim 17, wherein the logogram input comprises a logogram radical of the logogram and the corrected logogram input comprises a corrected logogram radical.

\* \* \* \* \*